(12) United States Patent
Pugh et al.

(10) Patent No.: US 11,023,624 B2
(45) Date of Patent: Jun. 1, 2021

(54) METHOD AND APPARATUS FOR LOCATING TRACKED ITEMS USING A MULTIPART SENSOR

(71) Applicant: Kyocera Document Solutions Inc., Osaka (JP)

(72) Inventors: Eric Pugh, Torrance, CA (US); Duc Phu Truong, West Covina, CA (US)

(73) Assignee: Kyocera Document Solutions Inc., Osaka (JP)

( * ) Notice: Subject to any disclaimer, the term of this patent is extended or adjusted under 35 U.S.C. 154(b) by 174 days.

(21) Appl. No.: 16/175,853

(22) Filed: Oct. 31, 2018

(65) Prior Publication Data

US 2020/0134242 A1 Apr. 30, 2020

(51) Int. Cl.
*G06F 21/88* (2013.01)
*H04W 4/33* (2018.01)

(52) U.S. Cl.
CPC .............. *G06F 21/88* (2013.01); *H04W 4/33* (2018.02); *H04N 2201/0094* (2013.01)

(58) Field of Classification Search
CPC .......... G06F 21/88; G06F 21/00; H04W 4/33; H04W 4/00; H04W 4/38; H04N 2201/0094; H04N 2201/00; H04N 2201/01
See application file for complete search history.

(56) References Cited

U.S. PATENT DOCUMENTS

| | | | |
|---|---|---|---|
| 2011/0038643 A1* | 2/2011 | Yamaki | G03G 15/55 399/8 |
| 2012/0238304 A1* | 9/2012 | Lambert | H04W 72/048 455/509 |
| 2014/0064164 A1* | 3/2014 | Nagaraj | H04W 52/0206 370/311 |
| 2017/0228935 A1* | 8/2017 | Foster | G06F 1/1694 |
| 2017/0270322 A1 | 9/2017 | D'sa | |
| 2017/0310849 A1* | 10/2017 | Hosoda | G06F 3/1236 |
| 2018/0176732 A1* | 6/2018 | Mikuriya | H04N 1/4426 |
| 2018/0375845 A1* | 12/2018 | Burns | H04L 63/08 |
| 2019/0349733 A1* | 11/2019 | Nolan | H04W 12/69 |

* cited by examiner

*Primary Examiner* — Quazi Farooqui
(74) *Attorney, Agent, or Firm* — James Judge

(57) ABSTRACT

A multifunctional printer (MFP) which has a first transceiver circuit which is configured to receive wireless broadcast signals from a second transceiver circuit, where the wireless broadcast signal identifies the second transceiver, where the first transceiver circuit is powered by the MFP, and where the first transceiver circuit is configured to determine a first distance that the second transceiver circuit is away from the first transceiver circuit.

11 Claims, 12 Drawing Sheets

METHOD AND APPARATUS FOR LOCATING TRACKED ITEMS USING A MULTIPART SENSOR

FIELD OF THE INVENTION

The present disclosure relates to using a multifunctional printer to locate items with tracking sensors.

BACKGROUND

Losing and misplacing objects in a home or office environment is a common occurrence. In the office, this can lead to a waste of time searching for the object, and to security issues if a misplaced item is a security badge, laptop computer, cellular phone, etc. The present invention has been made in light of the above problems.

SUMMARY

In an embodiment of the invention, a location system includes a first transceiver, a second transceiver, and a first office device, where the first transceiver is power by the first office device, and the second transceiver is powered by a battery, wherein the second transceiver is configured to periodically wirelessly broadcast an identification signal which identifies the second transceiver, where the first transceiver circuit is configured to receive the identification signal broadcast by the second transceiver and determine a first distance that the second transceiver is away from the first transceiver.

In another embodiment of the invention, a multifunctional printer (MFP) includes a first transceiver circuit which is configured to receive wireless broadcast signals from a second transceiver circuit, where the wireless broadcast signal identifies the second transceiver; wherein the first transceiver circuit is power by the MFP, where the first transceiver circuit is configured to determine a first distance away that the second transceiver circuit is from the first transceiver circuit.

It is noted that the term MFP refers to multifunctional printer, but can also refer to a printer, scanner, copy machine, or combination thereof, suitable for use in either a home or office. Further, the disclosure will use the term office device/ equipment/MFP interchangeably. For the purposes of this disclosure, the terms are interchangeable.

In another embodiment of the invention, a method of using first and second multifunctional peripherals (MFPs) to locate an object includes: using a first transceiver circuit, located in the first MFP, to receive a signal broadcast from a second transceiver circuit, which is with the object to be located; using a third transceiver circuit, located in the second MFP, to receive the signal broadcast from the second transceiver, determine a first distance that the second transceiver circuit is away from the first transceiver circuit; determining a second distance that the second transceiver is away from the third transceiver circuit; and triangulating the location of the second transceiver circuit using the first distance and the second distance.

BRIEF DESCRIPTION OF THE DRAWINGS

The following drawings illustrate examples of various components of embodiments of the invention disclosed herein and are for illustrative purposes only.

DETAILED DESCRIPTION

The illustrative block diagrams and flowcharts depict process steps or blocks that may represent assemblies, segments, or portions of code that include one or more executable instructions for implementing specific logical functions or steps in the process. Although the particular examples illustrate specific process steps or procedures, many alternative implementations are possible. Some process steps may be executed in different order from the specific description herein based on, for example, considerations of function, purpose, conformance to standard, legacy structure, user interface design, and the like.

The inventors have created a method and apparatus for quickly locating misplaced items. A small transmitter or transceiver can be placed on an item or items to be tracked. The item(s) to be tracked can be, for example, an identification badge, a laptop, keys, etc. A small receiver or transceiver can be integrated with or attached to an office device such as a printer, copier, facsimile machine, multifunction peripheral (MFP), etc. The item(s) with the transmitter/ transceiver can then be located by the receiver/transceiver, by the receiver/transceiver calculating the distance between the transmitter/transceiver and receiver/transceiver. This location information can then be provided to a user making an inquiry regarding the item. The location information can be provided to the user by displaying the information on a smart phone, computer, tablet, display screen of an MFP, etc. The information could also be printed out by the MFP, computer, etc. The transmitter/transceiver can also vibrate, make a sound, flash a light, or otherwise alert the user, to let the user know where the item is located. The details of several embodiments of the invention will be described below.

Figure 1:
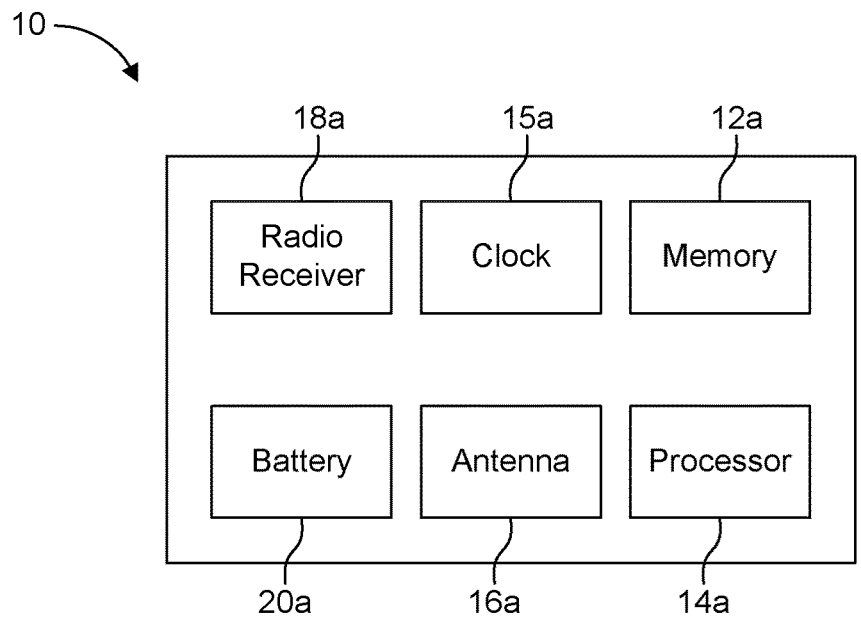
FIG. 1 shows a receiver and transmitter according to a first embodiment.
Figure 1:
Figure 1:
Figure 1:
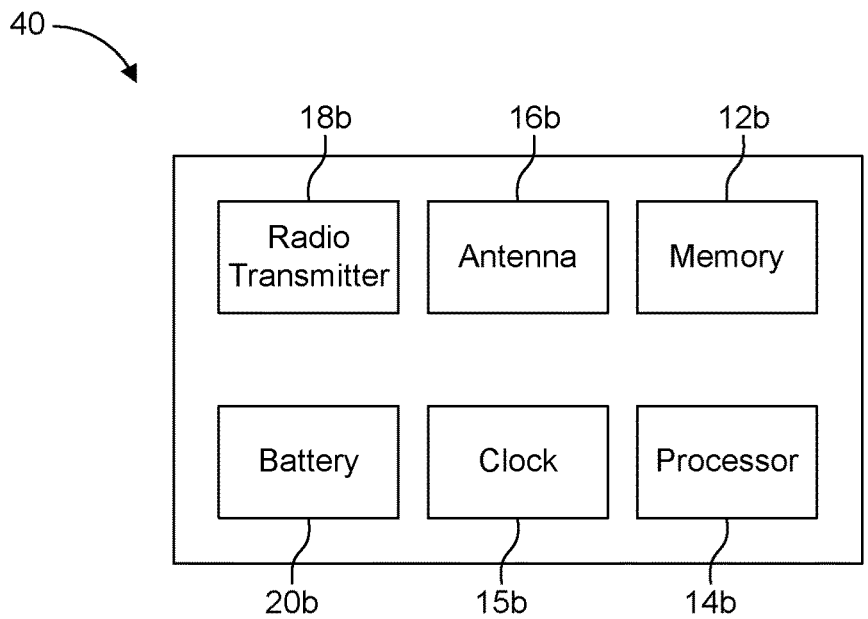

FIG. 1 shows an embodiment of the invention with a receiver circuit 10 in wireless communication with a transmitter circuit 40. The wireless communication can be via such communication standards and protocols as Bluetooth® RX or IEEE 802.11, for example. Receiver circuit 10 comprises constituent elements, not all of which are shown in the drawings. The elements of the receiver circuit 10 can include radio receiver 18a, battery 20a, memory 12a, processor 14a, clock 15a and antenna 16a. A speaker or other device to make sounds, and a light such as an LED can also be included, but are not shown.

The receiver circuit 10 can operate connected to one or more power sources, such as an internal battery, or can be connected to a power supply of an office device, or the like. The antenna 16a of the receiver can be a multidirectional antenna, designed to receive signals broadcast in all directions. Further, the antenna can also be a beamforming antenna for directional signal reception.

FIG. 1 also shows a transmitter circuit 40. Transmitter circuit 40 comprises constituent elements, not all of which are shown in the drawings. The elements of the transmitter circuit 40 can include a radio transmitting 18b, antenna 16b, memory 12b, battery 20b, clock 15b and processor 14b. A speaker or other device to make sounds, and a light such as an LED can also be included, but are not shown. Transmitter circuit 40 is designed to operate on battery power and is designed to be of a relatively small size so that it can be affixed, or otherwise attached, to tagged items and objects such as keys, mobile phones, laptop computers, identification badges, wallets, purses and the like. Further, transmitter circuit 40 can also use a power source from an electronic device such as a smart phone, laptop, solar cell, capacitor, etc.

Transmitter circuit 40 is designed to operate as a low-power transmitter in the same frequency range as the receiver is able to receive. This frequency range can be, for example, 2.4 GHz, and the transmitter circuit 40 can be configured with ultra-low power (ULP) requirements which enable months to years of operation on battery power alone. The transmitting power can be between 0.1 mW and several 100's of mW. The wireless communication method of the transmitter can be via such communication protocols as Bluetooth® RX or IEEE 802.11, etc. The antenna 16b of the transmitter can be a multidirectional antenna, designed to broadcast a signal in all directions. Further, the antenna can also be a beamforming antenna for directional signal transmission.

Examples of devices that could be used as the transmitter circuit 40 or the receiver circuit 10 include for example: a Raspberry Pi™ with an nRF24L01™ transceiver; an Arduino™ with an nRF24L01™ transceiver; an Espressif Systems ESP8266™ microchip; an application specific integrated circuit (ASIC); a complex programmable logic device (CPLD) with a transceiver; and a field programmable gate array (FPGA) with a transceiver. Further, a mobile electronic device, such as a smartphone, tablet, personal computer, etc., could also either host the transmitter or receiver circuit, or could use its own internal components to act as the transmitter or receiver circuit. Although this disclosure uses the term smartphone, for the purposes of this disclosure, a mobile electronic device, tablet, personal computer etc., with the communication and/or location features of a smartphone can be used instead in the embodiments described below. The embodiments of the invention are not limited to these examples; any circuit capable of executing the requirements of the invention could be used.

In one embodiment of the invention, the transmitter can be affixed to an item as discussed above. The transmitter can periodically transmit a radio signal which can be received by the receiver. The receiver can process the signal and then determine a distance between the receiver and the transmitter.

The distance can be determined in several ways. For example, the distance can be determined by analyzing the receiver signal strength from the transmitter. For an omnidirectional transmitter, signal strength generally follows the inverse square law ($1/R^2$), where R is the radius, or distance between the transmitter and receiver. Thus, a signal transmitted for 2 meters has the power of its radio signal drop to ¼ of the strength of the original transmitted power of the radio signal. A signal that is transmitted for 4 meters has the power of its radio signal drop by a factor of ¹⁄₁₆ of the strength of the original transmitted power of the radio signal.

Therefore, by knowing the power that the transmitter transmits at, and the power of the signal received at the receiver, it can be determined how far away the transmitter is from the receiver. The inverse square law assumes a clear transmission path with no obstacles and a perfect transmittance medium. Thus, if obstacles exist between the transmitter and the receiver, a weaker signal than expected could be received by the receiver. This would result in a determined location that is further away than the actual location.

This issue can be mitigated by having multiple receivers in a network, or by having the transmitters be transceivers, capable of communicating with other transmitters and relaying location information amongst the transceivers. This embodiment is discussed in detail later.

Receiver 10 can also determine a distance of the transmitter using a relative received signal strength indicator, also known as an RSSI value. As discussed above, transmission standards and protocols that could be used include Bluetooth® RX or IEEE 802.11, as examples. These standards use a relative received signal strength indicator (RSSI) value. This value can be used to determine the distance between the transmitter and the receiver.

For a power transmission of 100 mW, the typical range for which a signal can be received and used according to the above protocols is approximately 100 meters; for a power transmission of 2.5 mW, the typical range is approximately 10 meters; for a power transmission of 1 mW, the typical range is approximately 1 meter; and for a power transmission of 0.5 mW, the typical range is approximately 0.5 meters.

A transmitter can be programmed to transmit at different time intervals. For example, transmitter circuit 40 can transmit at intervals of 1 second, 1 minute, 10 minutes, 1 hour, etc. Each transmitter circuit 40 can also transmit with a code unique to that transmitter. The receiver circuit 10 can then receive each broadcast by the transmitter and determine the distance away that each transmitter is using the RSSI value. This information is stored in memory and can be made available upon request, printed to a report, etc.

Figure 2:
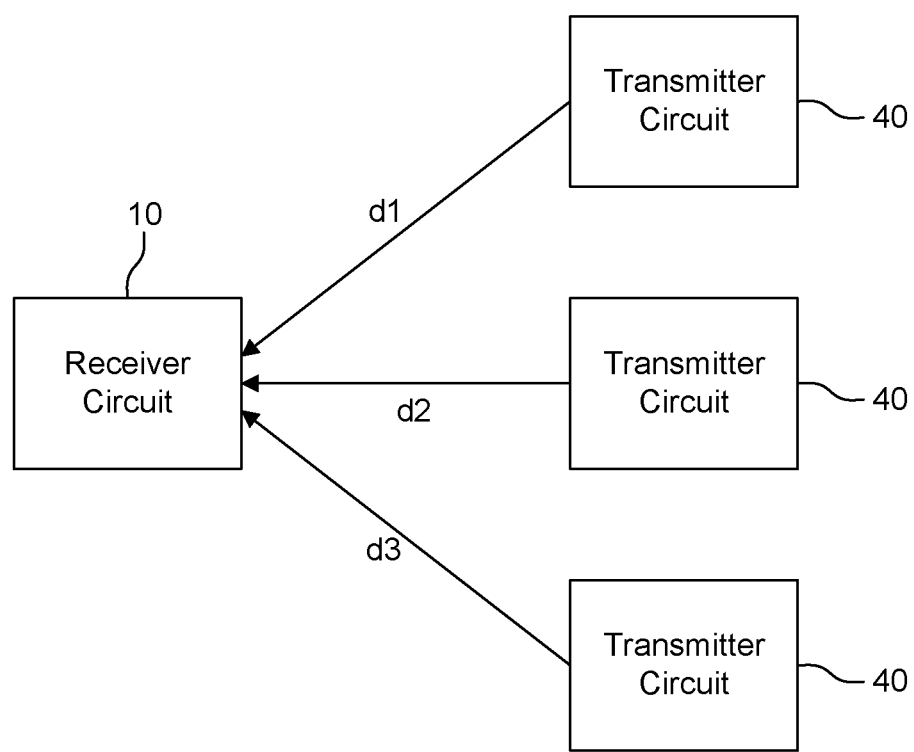
FIG. 2 shows three transmitters, at different distances, in communication with one receiver.

FIG. 2 shows an embodiment with three transmitter circuits 40, and a receiver circuit 10. The receiver circuit 10 is separated from the first transmitter circuit 40 by distance d1. The receiver circuit 10 is separated from the second transmitter circuit 40 by distance d2. The receiver circuit 10 is separated from the third transmitter circuit 40 by distance d3. The receiver circuit 10 can distinguish amongst the various transmitters based on their unique code, and can determine a distance that each transmitter circuit 40 is away from the receiver circuit 10.

As shown in FIG. 2, the receiver circuit 40 is configured to receive a signal from three transmitter circuits 40. The invention is not limited to this number of receiver circuits and transmitter circuits and the receiver circuit could receive signals, for example, from tens or hundreds of transmitters. That is, in a large office environment, hundreds of people could be sharing a space with one or more office devices. Each user could have one or more transmitter circuits to keep track of various objects. The receiver circuit 10 in this environment would therefore be required to process a plurality of incoming signals simultaneously and store the location or distance of the item in memory.

Figure 3:
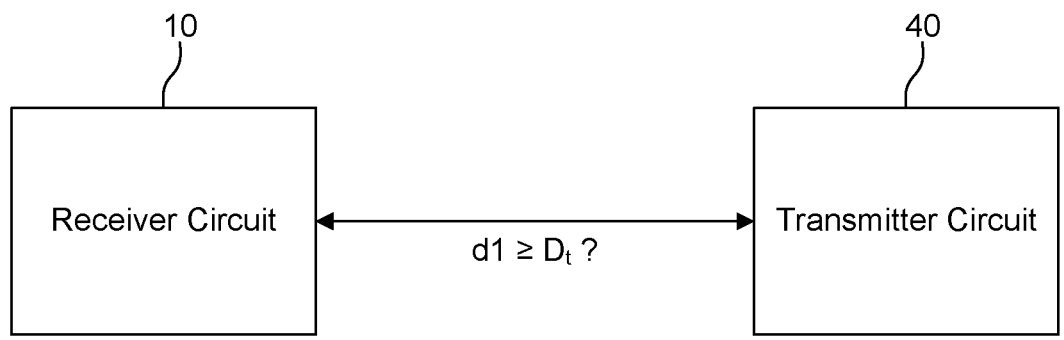
FIG. 3 shows a threshold distance where a receiver can and cannot receive a signal from a transmitter.

FIG. 3 provides an example of the distance the receiver circuit is able to accurately receive from the transmitter. For example, while the transmitted signal from a transmitter circuit 40 will in theory be propagated an infinite distance, in practical terms, once the signal strength reaches a certain level, the antenna and processor of the receiver circuit are no longer able to accurately detect and analyze the signal.

FIG. 3 shows an example of a threshold beyond which a receiver circuit 10 cannot accurately receive and process a signal from the transmitter circuit 40. For example, a transmitter circuit 40 can be programmed to send a signal every 1 minute. The receiver circuit 10 is then expecting to receive a signal from transmitter circuit 40 every 1 minute. If the receiver circuit 10 doesn't receive the signal at the predetermined time, then it is determined that the transmitter circuit 40 is outside of the transmission range $D_r$. If the transmission range is 20 meters, then the transmitter circuit 40 is at least 20 meters away from the receiver circuit 10.

It is possible that the transmission from the transmission circuit is blocked by an obstacle, or the transmission medium is attenuating the signal beyond the expected amount. However, in these cases, if a signal is not received from the transmission circuit 40, it is assumed that the transmission circuit 40 is beyond the transmission range $D_r$.

Further, if the receiver circuit 10 determines that the transmitter circuit 40 is outside the transmission range from the receiver circuit, this could trigger an alarm. For example, the receiver circuit 10 could notify security, raise an internal flag, or notify the user that the transmitter circuit 40 is outside the transmission range from the receiver.

Conversely, in this example, if the transmitter circuit 40 is within 20 meters of the receiver circuit 10, then the receiver circuit 10 will receive a transmission signal every 1 minute. The transmission signal will contain at least an identification code of the transmitter circuit 40. Based on the signal strength received at the receiver circuit 10, a determination can be made as to how far away the transmitter is from the receiver and this information can be stored in memory and accessed when a user performs as query as to where the tracked object with the transmitter circuit is located.

Figure 4:
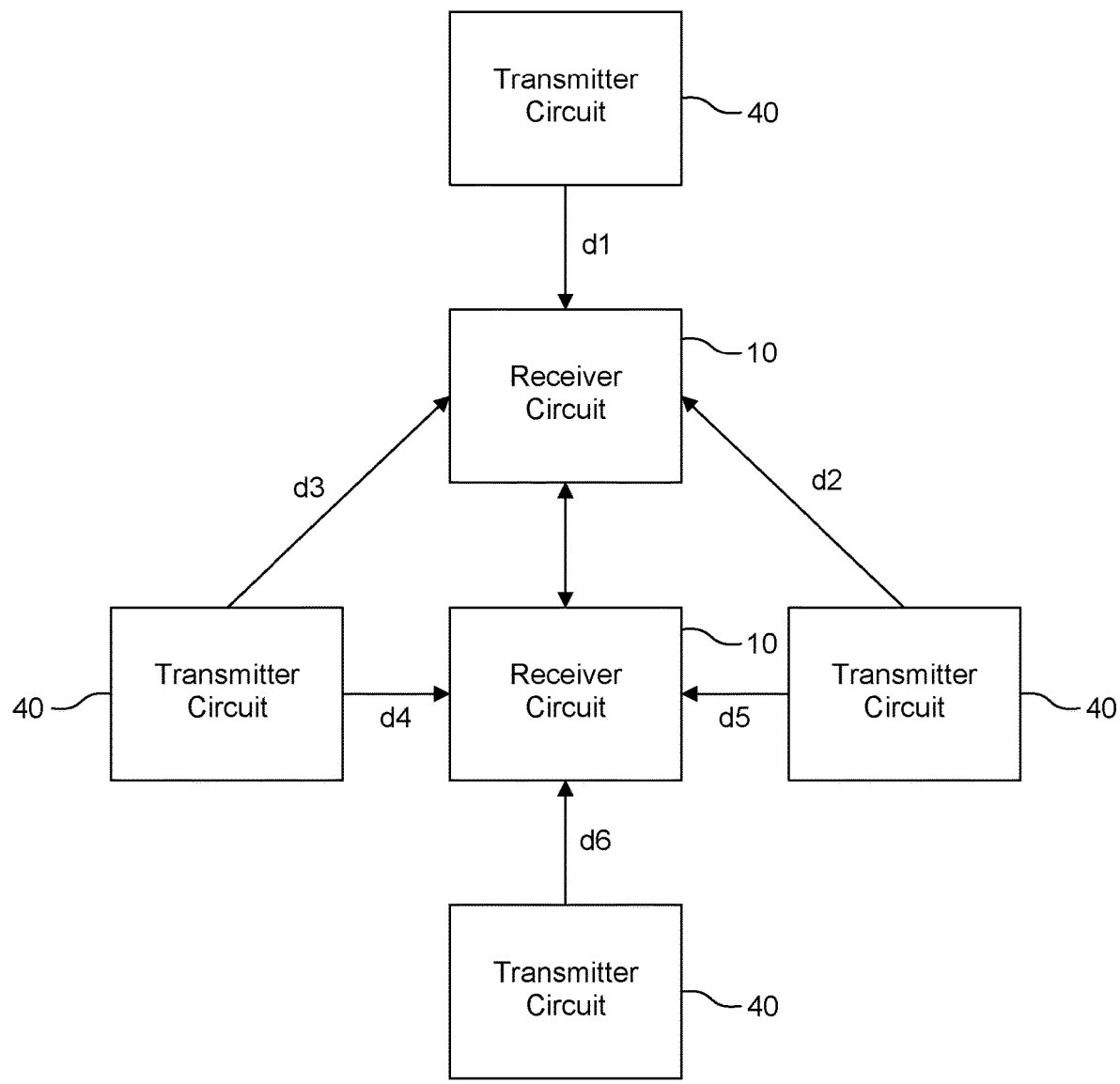
FIG. 4 shows a network of receivers in communication with a plurality of transmitters.

FIG. 4 shows an example of a network of receivers 10 that are in communication with transmitter circuits 40. The transmitter circuits and receiver circuits could be within a single room or could be spread throughout several rooms, as long as radio communication between at least one transmitter circuit and one receiver circuit is occurring. The receiver circuits 10 could be used, for example, in an office location where each receiver circuit 10 is paired with an office device such as a printer, where there are multiple printers in the office location. The receiver circuits 10 could also be used in a home environment where a first receiver circuit 10 is paired with a printer, scanner, copy machine, MFP, etc. and a second receiver circuit 10 is paired with another office device, such as a printer, scanner, copy machine, MFP, etc. While not necessary, it is preferably to pair the receiver circuit 10 with devices that are generally stationary. This avoids the situation where the locations of both the receiver circuit 10 and transmitter circuit 40 are unknown.

As discussed earlier, each receiver circuit 10 is capable of receiving transmission signals from a plurality of transmitters 40. If two receivers can detect a transmitted signal from a transmitter circuit, then a more accurate location of the transmitter circuit can be determined in a number of ways. The location of the transmitter circuit can be "triangulated" using two receivers. Two circles representing the distance from each receiver to where the signal could originate from, will necessarily overlap at two points. These two points indicate the possible locations of the transmitter circuit.

In the case where three receivers 10 can receive the transmitted signal from the transmitter circuit 40, the signal source can be triangulated, and an exact location can be determined as the transmission point.

In one embodiment, a map could be displayed on an MFP or other electronic device, which shows the location or possible locations of the objected to be located, in relationship to the MFP.

Of course, the RSSI value is not necessarily perfect and has an inherent margin of error. Thus, when trying to determine the location of the transmitter circuit, instead of identifying exactly a single point where the item is located, it may only be possible to identify a small area where the item is located. Additional receiving circuits can confirm this location if they are in communication with the transmitter circuit, and can provide more precision if needed.

If only a single receiver circuit 10 is receiving a signal from a transmitter circuit 40, then only the distance from the receiver circuit 10 to the transmitter circuit 40 is determined. This is because the transmitter circuit 40 is omnidirectional, and based solely on the signal strength received at the receiver, a distance (or radius) can be determined. But without an additional data point, the location of the transmitter is narrowed to the radius of the circle based on the RSSI value.

Another advantage of having multiple receiver circuits 10 is that a transmitter circuit 40 may be out of range of one receiver circuit 10, but may come into range of another receiver circuit 10. For example, in a large office, a user may travel from one room to an adjacent room. Thus, the user may go out of range of a first receiver circuit 10, but enter the range of a second receiver circuit 10. The transmitter circuit 40 can therefore be tracked over a greater area than if a single receiver circuit 10 was used.

Figure 5A:
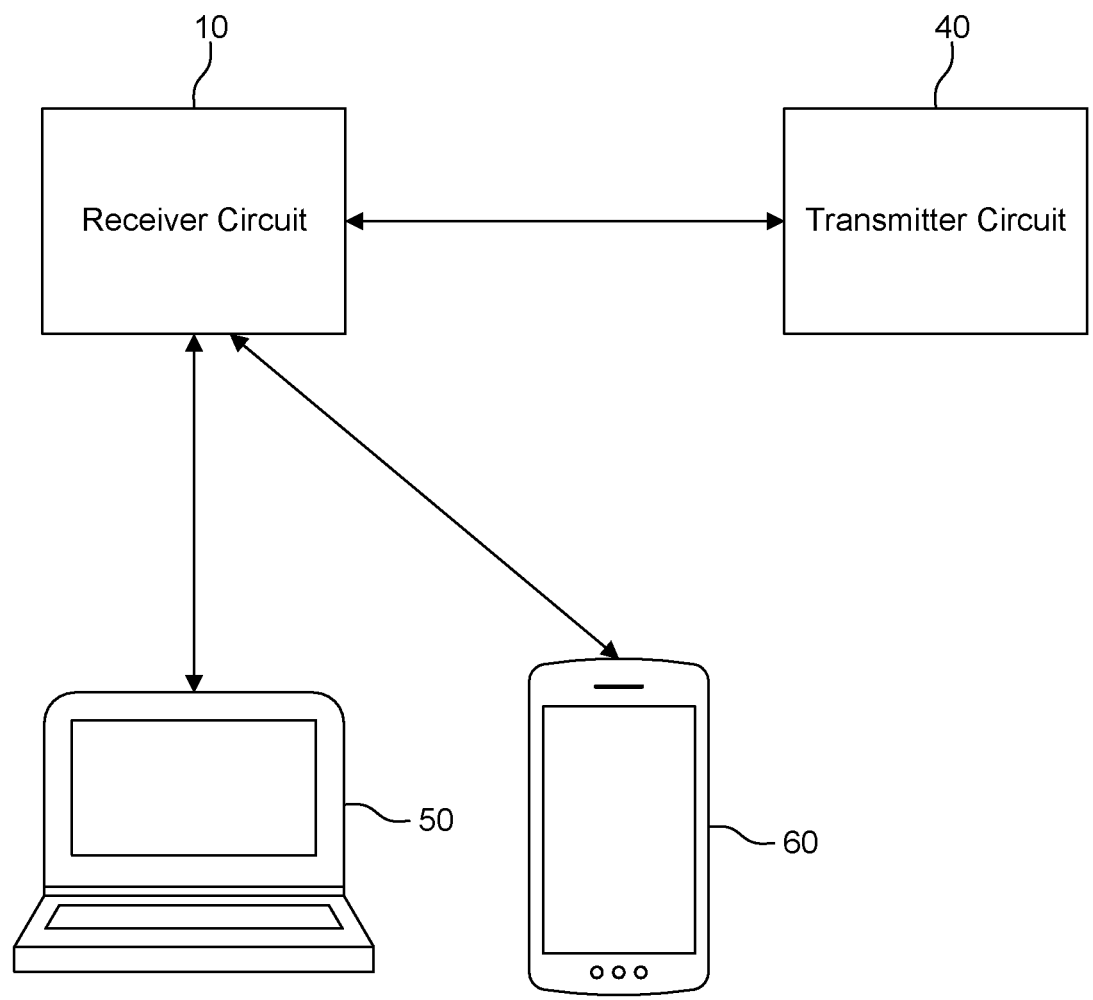
FIG. 5A shows communication between a personal computer and smart phone and a receiver.

FIG. 5A shows an example of a smartphone 60 or computer 50 used to query the location of a transmitter circuit 40. It is noted that a computer can be a server computer, personal computer, tablet, etc. A smartphone or personal computer can send an inquiry to a receiver circuit 10 to determine a location of the transmitter circuit 40. This inquiry can be sent over a wired or wireless network, such as a local area network (LAN), the Internet, or be via Bluetooth®, etc. Thus, a user could log into a website, a cloud server 66 through a network 65, or use an app on a smartphone to inquire about the location of a particular transmitter circuit 40. The receiver circuit 10 can access memory to determine the most recent location of the transmitter circuit 40 and relay this information to the smart phone 60 or computer 50.

Figure 5B:
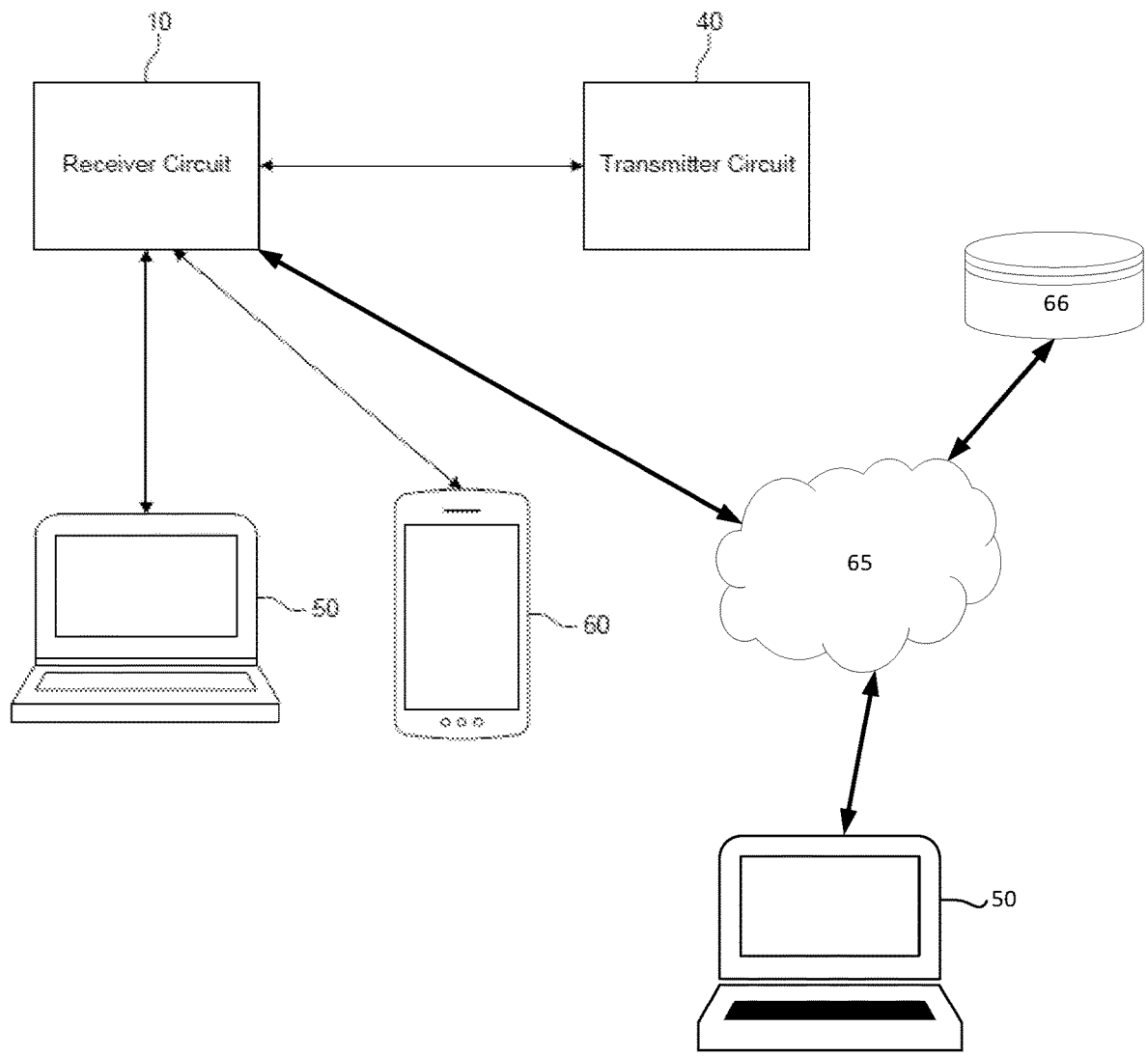
FIG. 5B shows communication between a personal computer and smart phone and a receiver, using a cloud-based system.

Further, a cloud-based system could be implemented at a facility which hosts an MFP, which could be accessed by a user, as shown in FIG. 5B. The cloud-based system could be a network 65, such as a local area network contained within the facility, or could be connected to the Internet and remotely hosted. The cloud based system could be implemented by one or more networked servers connected to storage 66. Using this cloud-based system, an individual transceiver, or transceiver group can be looked-up and a log file can be accessed of where the transceiver (or transceiver group) has been and where it is currently located. For example, a user could wish to determine where all of the transceivers in a particular department or grouping have been, or presently are. The user could log into the storage 66, which is connected to one or more networked servers, using a website, special purpose application which uses an application programming interface (API), etc. This could be done through an MFP, smartphone 60, computer 50, etc. Thus, a plurality of transceivers can be grouped together for tracking purposes and easily accessed by the user.

Additionally or alternatively, a map can be created by the networked computers and presented to the user, showing past locations of the transceiver (or transceiver group) and a present location of the transceiver (or transceiver group). The transceivers could be registered in advance with the cloud-based system, and once registered, the system could keep track of each transceiver.

The location of each transceiver, shown in the cloud-based system of FIG. 5B, could be updated periodically, for example, every 5 seconds, every 5 minutes, every hour, etc. The transceivers could be identified and located by the one or more MFPs, and could also be located using GPS or AGPS (as discussed below). The MFPs can be in wireless or wired communication with one another and the cloud-based system.

The cloud-based system could contain location information of transceivers for one or more facilities housing MFPs. Thus, multiple facilities could use the same cloud-based system in order to keep track of multiple transceivers. The cloud-based system could obtain the location information from each transceiver, MFP, computer 50, smart phone 60, etc.

As shown in FIG. 5A, if there are two or more receiver circuits 10 which are in communication range of one another, the receiver circuits 10 can exchange location information with respect to the transmitter circuit 40. For example, for a given transmitter circuit 40, two receiver circuits 10 in communication with the transmitter circuit 40 can exchange information with one another so that the receiver circuit 10 with the shortest distance between it and the transmitter circuit 40 is saved in memory. This system allows each receiver circuit 10 to store the information of the receiver circuit 10 closest to each transmitter circuit 40.

Therefore, if there is more than one receiver circuit 10, the inquiry from the smart phone 60 or computer 50 will be received by the first receiver circuit 10 and the first receiver circuit 10 will be able to access memory to determine the receiver circuit 10 which is closest to the transmitter circuit 40. This information can be transmitted back to the computer 50 or smart phone 60.

Alternatively, as discussed above, if the receiver circuits 10 are in communication with the transmitter circuit 40, the receiver circuits can triangulate the location of the transmitter circuit 40. The triangulated location of the transmitter circuit 40 can then be saved in memory of one or more receiver circuits and provided to a user upon request.

Figure 6:
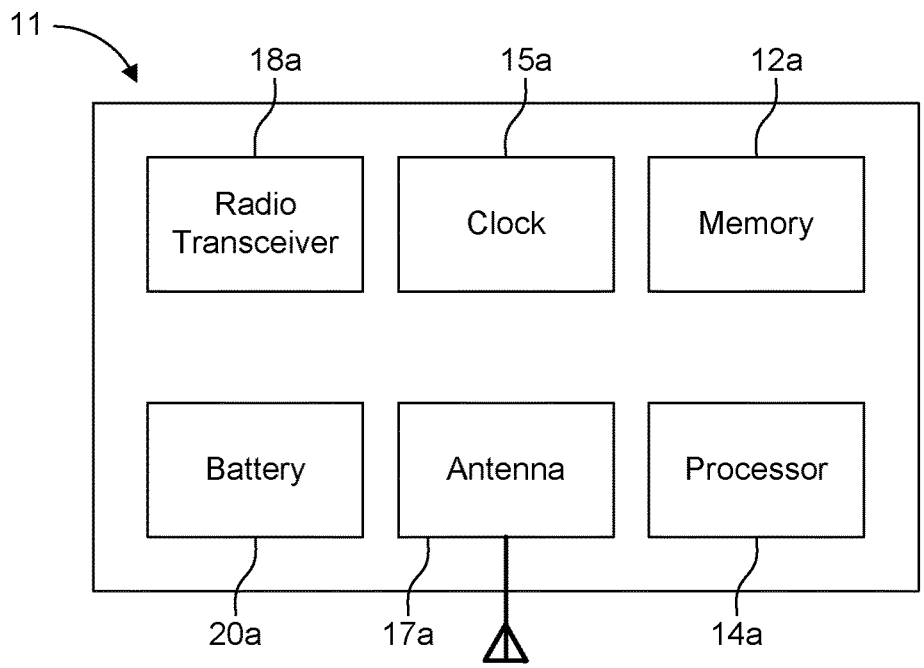
FIG. 6 shows an embodiment of transceivers in communication with each other.
Figure 6:
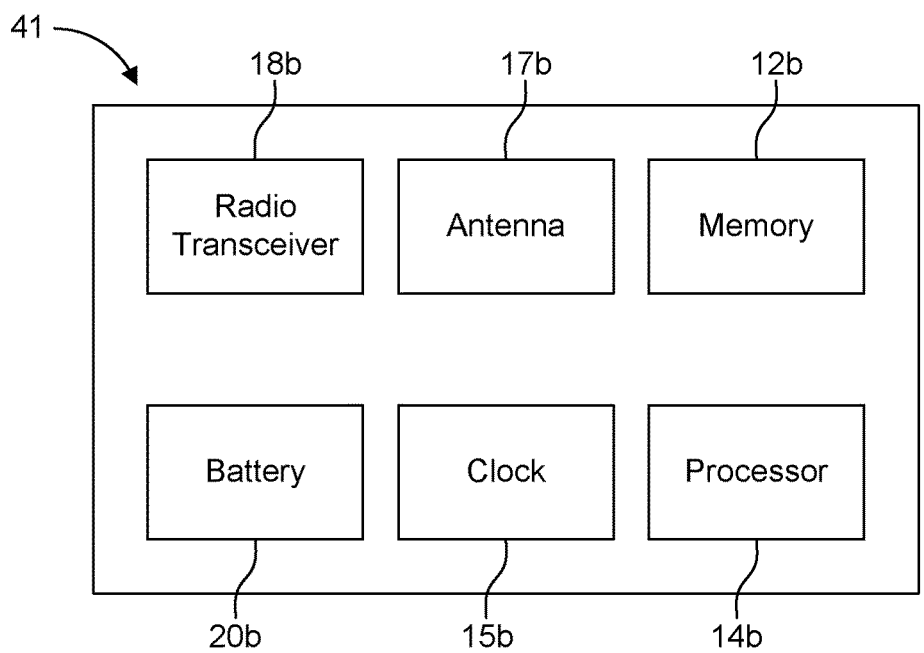

FIG. 6 shows another embodiment of the invention. In this embodiment, each device, former transmitter circuit 40 and receiver circuit 10, is now a transceiver circuit 11 and transceiver circuit 41 respectively, and can transmit and receive radio signals. That is, transceiver circuit 11 and transceiver circuit 41 can be structurally similar or the same, but differ in their mode of operation. Each transceiver circuit 11, 41 can communicate with adjacent transceivers circuits 11, 41, as shown by communication lines d1 to d9 in FIG. 7.

Examples of devices that could be used as the transceiver circuits 11 or 41 include for example: a Raspberry Pi™ with an nRF24L01™ transceiver; an Arduino™ with an nRF24L01™ transceiver; an Espressif Systems ESP8266™ microchip; an application specific integrated circuit (ASIC); a complex programmable logic device (CPLD) with a transceiver; and a field programmable gate array (FPGA) with a transceiver. Further, a mobile electronic device, such as a smartphone, tablet, personal computer, etc., could also either host the transmitter or receiver circuit, or could use its own internal components to act as the transmitter or receiver circuit.

Having transceiver circuits 11, 41 in the network allows for a more accurate location of the object to be determined and a more robust network to be formed. For example, the transceiver circuits connected to an office device, hereinafter "office-device transceiver circuits," can communicate with one another and share information on the object transceiver circuits. If there are 3 object transceiver circuits in communication with 3 office-device transceiver circuits, the office-device transceiver circuits could share distance and location data of the object transceiver circuits with the other office-device transceiver circuits. Thus, each office-device transceiver circuit could store the minimum distance an object transceiver circuit is located away from an office-device transceiver circuit. Further, each office-device transceiver circuit could store in memory the location of an object transceiver circuit.

The method of determining the distance is the same as previously discussed, except instead of a transmitter transmitting to a receiver, it is a transceiver, operating as a transmitter, transmitting to a transceiver, operating as a receiver.

If a user queries the location of a particular object transceiver circuit, then any given office-device transceiver circuit would have this information in memory, and a timely and accurate response could be returned to the user.

Figure 7:
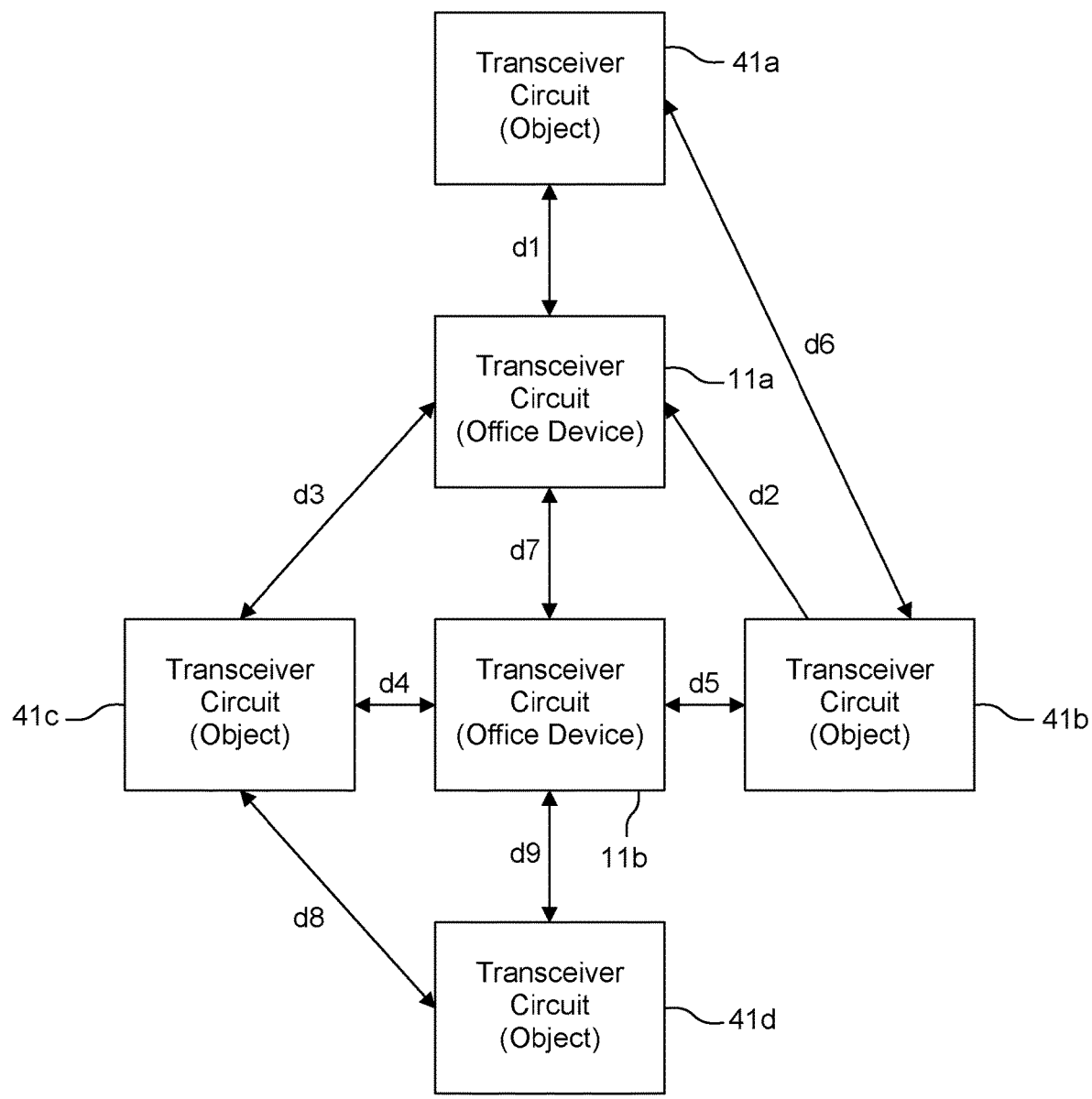
FIG. 7 shows a network of transceiver/receivers in communication with a plurality of transmitter/transceivers.

For example, as shown in FIG. 7, if a user wishes to find the location of transceiver 41a, the user can query an office device where a transceiver circuit 11a/11b is located, by logging into the Internet, or using an app, or the like. The office device with the transceiver circuit 11a or 11b can then access its logs to determine the location of the transceiver 41a. As each office device stores that office device whose distance to the object transceiver is minimum, this can be quickly accomplished.

Further, the office device transceiver circuits can communicate with each other on a periodic basis. For example, the office device transceiver circuits can share location data with one another every 15 seconds, 30 seconds, 1 minute, 5 minutes, 15 minutes, 1 hour, etc. The office device transceiver circuits can also share location data when a user requests the location of an object. Thus, the information on the object transceiver circuits can be updated regularly. Therefore, if an object transceiver circuit is moved, the location logs of the office device transceivers can be updated.

It is noted that the location of object transceiver circuit 41a can be further narrowed down using the information gathered by object transceiver circuit 41b. That is, as shown in FIG. 7, object transceiver circuit 41a and object transceiver circuit 41b are in communication with each other. Thus, object transceiver circuit 41b can determine how far away object transceiver circuit 41a is, using the RSSI value as discussed previously. This information can be used together with the information from office-device transceiver circuit 11a to determine an area where transceiver circuit 41a is located. That is, similar to the discussion above, the office-device transceiver circuit 11a and the object transceiver circuit 41b can be used to triangulate the position of the object transceiver circuit 41a. This information can be stored in the office-device transceiver circuits and provided upon request.

Figure 8:
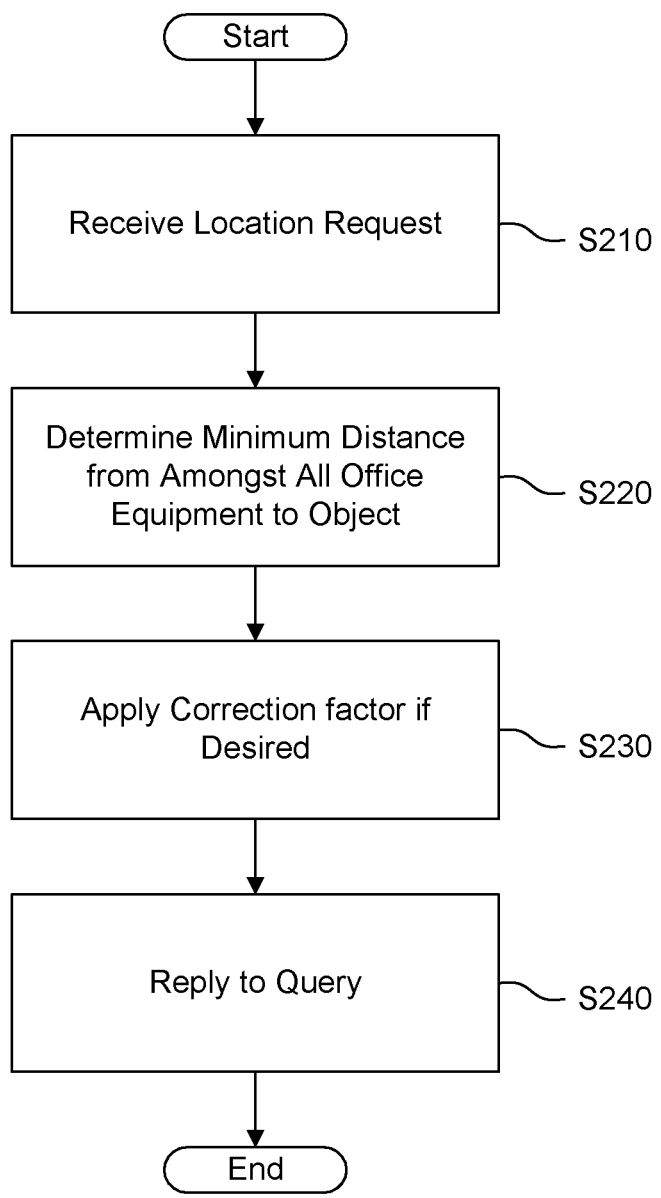
FIG. 8 shows a flowchart of querying an office device to locate an object which is being tracked.

An example of querying an office-device transceiver circuit is shown in FIG. 8. As shown in FIG. 8, a request for a location of an object is received by an office-device receiver circuit or transceiver circuit in step 210. This request can be performed over the Internet, through the use of an app or website, or could be performed using radio communication with the office-device transceiver circuit, etc. Further, this request could be performed by a computer or smart phone, as discussed in FIG. 5A. The request could be directly sent to the office-device transceiver circuit, or could be sent to the office device itself, which would then either route the request to the office-device transceiver circuit, or perform the processing necessary to determine an object transceiver location, with access to the office-device transceiver circuit's memory and systems.

The office-device transceiver circuit that received the query can then check memory to determine which office device is located closest to the object in step 220, and how far away the device is. Optionally, in step 230, a correction factor can be applied to attain a more accurate distance between the office device and the object to be detected. Determining a correction factor will be discussed in detail with respect to FIG. 11. The correction factor is a unitless number which can be multiplied by the determined distance between the office device transceiver and the object transceiver. Once the location of the object is determined, a reply to the query can be sent by the office device transceiver circuit in step 240. This reply can be sent over the Internet, using radio communication, etc., to the device that made the query.

In another embodiment, an office-device transceiver circuit could also send out a signal to the object transceiver circuit, instructing the object transceiver circuit to start beeping, or otherwise alerting the user where the object is. For example, the object transceiver circuit could flash a light, vibrate, etc., in order to alert the user to the object's location.

In another embodiment of the invention, multiple transceiver circuits 11, 41 or receiver circuits 10 could be used in a single office device. For example, if using a transceiver circuit or receiver circuit in an MFP multipurpose copy machine, unless the transceiver/receiver has a clear line of sight to the transmitter circuit or transceiver circuit that is with the object to be located, the signal may be blocked by the multipurpose copy machine itself.

Figure 9:
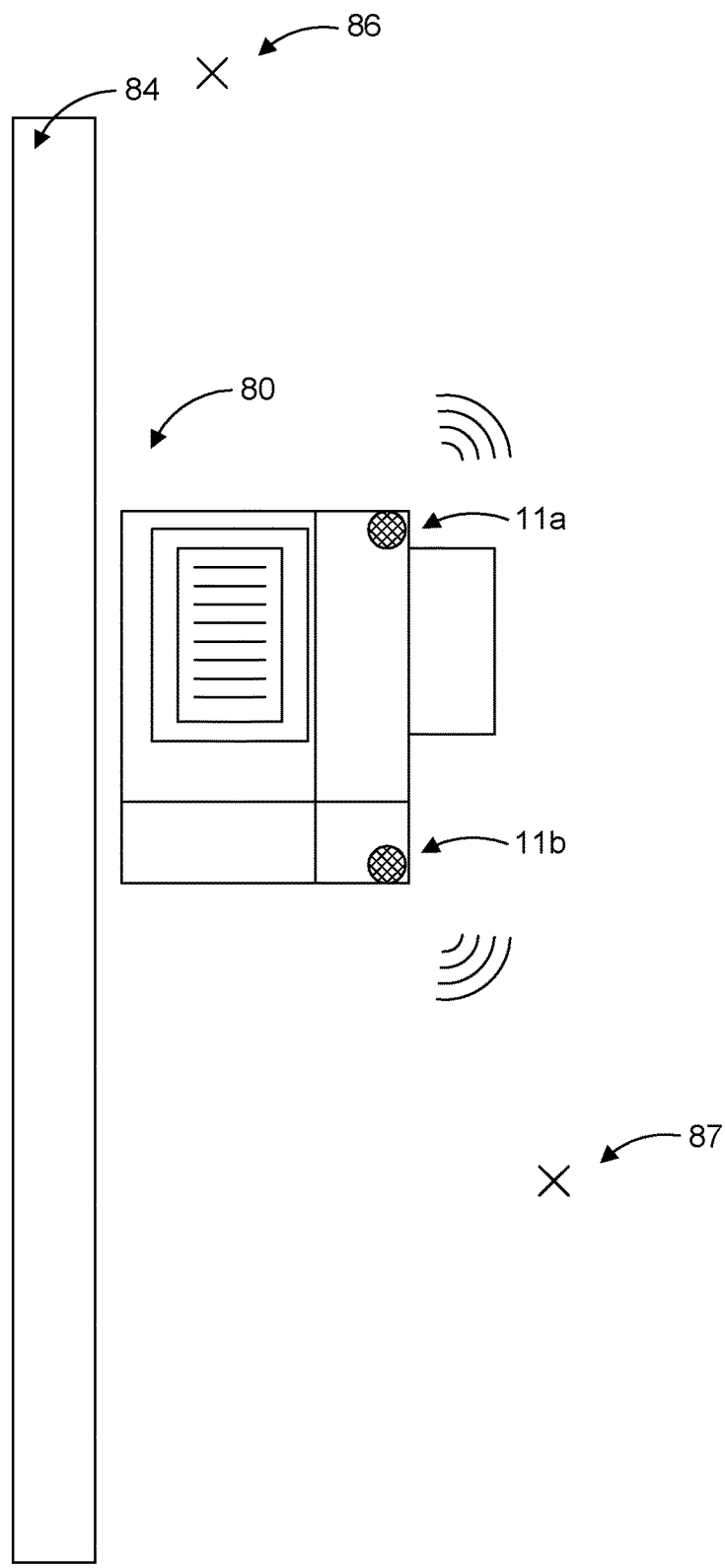
FIG. 9 shows an embodiment of two receivers located in an office device which is positioned next to a wall.

FIG. 9 shows an embodiment where first transceiver 11a is positioned in a first corner of an MFP 80 and second transceiver 11b is positioned in a second corner of MFP 80. Similar to the discussion above, the MFP 80 could also be a printer, scanner, copy machine, or combination thereof, suitable for home or office use. As shown in FIG. 9, the MFP 80 is positioned near wall 84. If an object to be tracked with a transceiver is positioned at point 86, the broadcast signal can be detected by transceiver 11a. However, transceiver 11b would be unlikely to be able to receive the broadcast transmission from a transceiver at point 86 because the MFP 80 would be likely to block the signal.

Conversely, if an object to be tracked with a transceiver is positioned at point 87, the broadcast signal can be detected by transceiver 11b. However, transceiver 11a would be unlikely to be able to receive the broadcast transmission from a transceiver at point 87 because the MFP 80 would be likely to block the signal. Thus, having more than one transceiver in or with an office device could help extend the coverage area of the transceiver.

Figure 10:
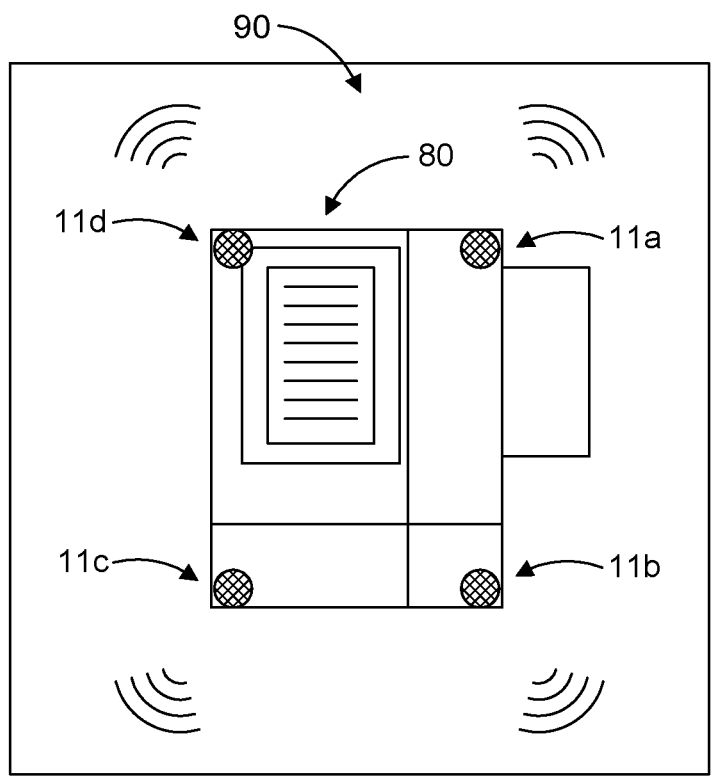
FIG. 10 shows an embodiment of four receivers located in an office device which is located toward a center of a room.

FIG. 10 shows an embodiment where first transceiver 11a is positioned in a first corner of MFP 80 and second transceiver 11b is positioned in a second corner of MFP 80, and third transceiver 11c is positioned in a third corner of MFP 80 and fourth transceiver 11d is positioned in a fourth corner of MFP 80. As shown in FIG. 10, the MFP 80 is positioned near the center of room 90. With a transceiver positioned on each corner of the MFP 80, this provides a 360° field of coverage for the receiving transceivers being able to pick up a signal from a transmitting transceiver.

Employing Assisted GPS

In another embodiment, the office device with one or more transceivers could also use the global position system (GPS) or assisted global positioning system (AGPS) to help more accurately determine the location of the object/transceiver. AGPS is a technology commonly used in mobile phone applications. With AGPS, instead of the mobile phone communicating with overhead satellites to determine its location, the mobile phone can communicate with a network station, such as a cellular phone tower, to determine its location. In this embodiment, the office device is equipped with GPS/AGPS, while the tracked object is not equipped with a GPS/AGPS.

The office device equipped with a transceiver can determine its precise location using GPS/AGPS. This can be done for each transceiver of each office device. The transceivers on each office device can also perform a distance calculation between one another to determine a distance between each office device.

In one embodiment, the GPS/AGPS feature can be achieved with a cellular phone or smartphone being in communication with the office device. For example, the smartphone can be connected with a wired or wireless connection to the office device. The smartphone can then share its location with the office device, thereby providing a precise location of the office device itself. This location can be stored in memory by the office device, and accessed when needed. By using a smartphone connection, the office device is able to be made without more costly GPS/AGPS circuitry and components.

Next, a correction factor can be calculated for the set of office devices. This correction factor can be expressed by a unitless ratio. For example, if the GPS/AGPS indicated that a first and a second office device were 5 meters apart, and the transceivers between the respective devices indicated that the devices were 4 meters apart, using RSSI for example, this would yield a ratio of 5/4. A ratio can be calculated for each pair of office devices. Each of the calculated ratios could then be averaged together to yield a correction factor. It is noted that the correction factor applicable to situations where the office devices are within a communication network. That is, if an office device is not in the communication network with other office devices, then a correction factor cannot be calculated.

The correction factor can be applied toward the distance calculation for calculating a distance between a transmitter/transceiver and receiver/transceiver. For example, if the distance calculated between a transmitter/transceiver and receiver/transceiver is 4 meters, then applying the correction factor of 5/4 would yield an actual distance of 5 meters.

Figure 11:
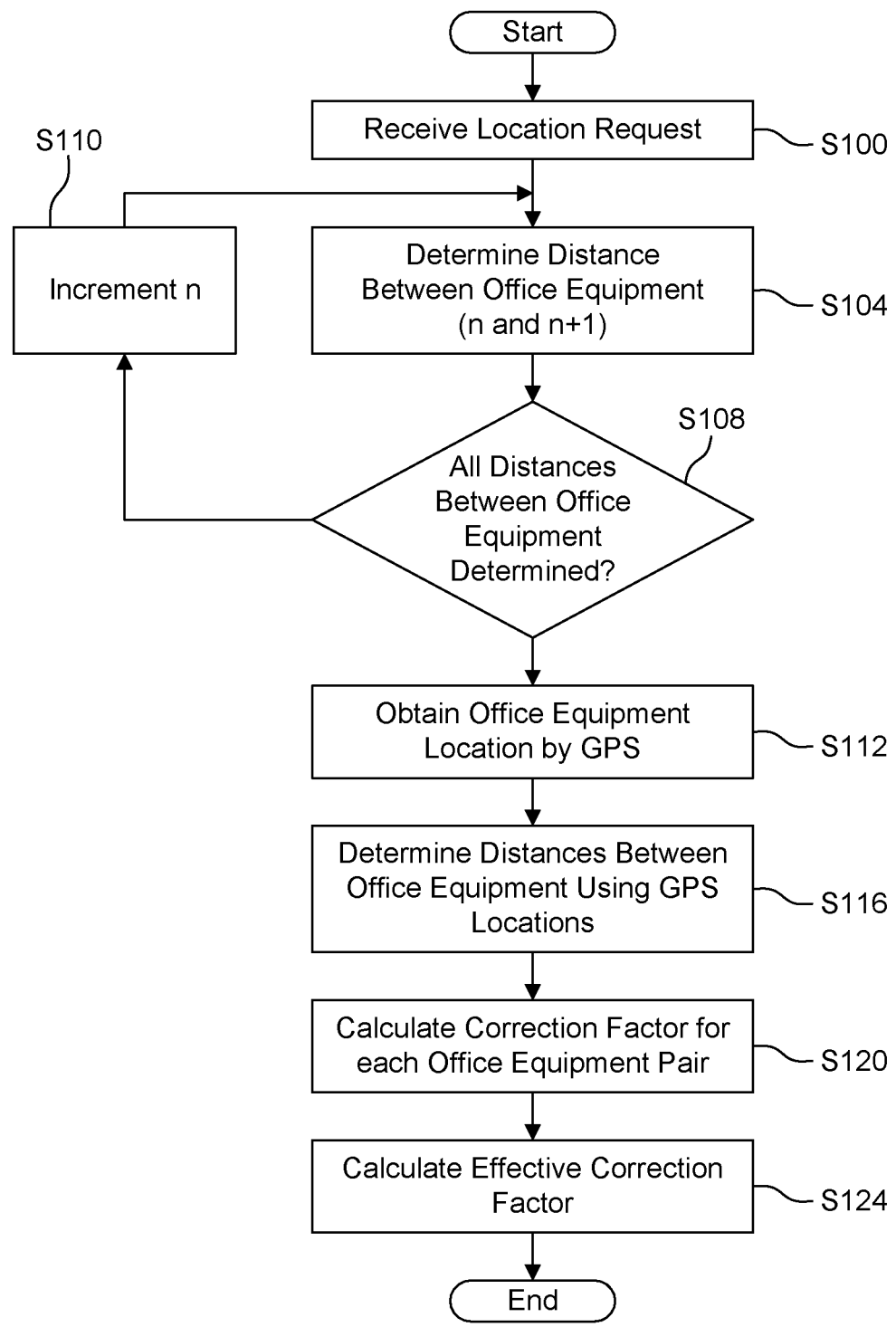
FIG. 11 shows a process of determining a location of an object.

An example of the process of the embodiment is shown in FIG. 11. First, a location request is received by the office device in step 100. This request can come over a WAN, a LAN, the Internet, or via Bluetooth® or other radio communication, etc. The office device or the transceiver circuit that receives the request can process the incoming request. The location request should identify the specific object(s)/transmitter circuit(s) that the user wishes to locate. Alternatively, a location request for a group of objects/transmitter circuits or for all of the objects/transmitter circuits could also be requested.

Next, in step 104, the receiver circuits/office device that received the request can check its own memory/logs to determine which office device is closest to the transmitter circuit. This distance between each of the office devices is calculated based on an RSSI value, as discussed above. The office devices can be in constant communication with one another, exchanging information regarding the location of the transmitter circuit(s). Thus, when an inquiry is received, the information can quickly be obtained from memory. Alternatively, once a query is made by a user, the office devices can communicate with one another and exchange location information to determine the office device that is closest to the object(s), as discussed below.

In step 108 it is determined if all distances between office devices has been ascertained. The distances between each office device and each object will usually already be saved in memory, in a location log for example. However, if the distance between each pair of office devices has not been determined, then an inquiry can be made to the specific office device to notify the other office devices of the distance between it and the object(s). This can be accomplished by the office device that received the location request sending an instruction to the office device pair that does not have a saved distance between them, to communicate with one another to determine the distance between them. This process is repeated until all pairs of office devices have saved distances between them.

Next in step 112, the location of each office device is determined by GPS or AGPS. That is, each office device determines its location and stores the location in memory. As before, this GPS/AGPS location information is also shared among all office devices. As discussed previously, the office devices can communication with one another through a wired or wireless medium, by using the Internet, or via Wi-Fi™, Bluetooth®, etc.

Next, in step 116 a determination is made as to the distance between each pair of office devices using the GPS or AGPS locations. This is similar to what was discussed above with respect to step 104, except instead of using an RSSI value, the GPS/AGPS values are used. Once all of the distances between each pair of office devices have been calculated, the information is shared with each office device, and saved into memory of each office device.

Next, in step 120, a correction factor for each pair of office devices is calculated. This is done by dividing the GPS/AGPS distance for the respective pair of office devices and the RSSI calculated distance for the respective pair of office device. For example, if the GPS/AGPS indicated that a first and a second office device were 5 meters apart, and the transceivers between the respective devices indicated that the devices were 4 meters apart using an RSSI value, this would yield a ratio of 5/4.

That is, assuming that the GPS/AGPS location data is more accurate than the RSSI value data, the RSSI value-based location is off by 25%. That is, the location using the RSSI value data should have been 5 meters instead of 4 meters. This error would be consistently propagated when determining the distance between an office device and a tracked object. As mentioned previously, the tracked object does not have GPS/AGPS and therefore an RSSI value calculated based on a transmission from the tracked object must be used to calculate the distance/location of the tracked object. Thus, a correction factor for the particular pair of office devices can account for this error. A correction factor could then be calculated for every pair of office devices.

In step 124 an effective correction factor is calculated that takes into account the entire network of office devices. This can be done by taking an average of the correction factors for each pair of office devices, for example. Alternatively, a difference of correction factors could be weighted before the average is taken. For example, if a received GPS/AGPS signal was stronger or more accurate for a particular pair of office devices, their correction factor could be weighted higher, as the accuracy of their location could be greater. This effective correction factor can then be used to help determine a more accurate distance between an object to be tracked and any office device. The effective correction factor applies to all of the office devices. Thus, office device 11*a* and 11*b* would have the same effective correction factor.

As discussed in the example above, if the distance calculated between a transmitter/transceiver and receiver/transceiver was 4 meters, then applying the correction factor of 5/4 would yield an actual distance of 5 meters.

Employing Smartphone as Receiver

In another embodiment, a smartphone can be equipped with a receiver/transceiver, so that it can receive signals transmitted from the transmitter/transceiver. A smartphone equipped with a receiver/transceiver circuit can also act as a receiver with GPS/AGPS capability. The smartphone can then operate in the same manner as an office device with a GPS/AGPS capability. Please see the discussion above with respect to FIG. 11 above. The smartphone can act as a replacement for one of the office devices. Then an effective correction factor can be calculated that can be used by the office device(s) and/or the smartphone.

The receiver/transceiver circuit may be attached to and in communication with the smartphone itself. The communication between the smartphone and the receiver/transceiver could be wired or wireless. For example, the receiver/transceiver could be plugged into the smartphone, or could simply be in communication with the smartphone via a wireless protocol such as 802.11, or Bluetooth® or other radio communication.

Using a smartphone with a receiver/transceiver circuit can provide a cost effective way to locate an object. For example, using only a single MFP and a smartphone equipped with a receiver/transceiver, an accurate position of the object can be determined, as discussed in examples above which use multiple MFP's or receiver/transceivers.

A number of embodiments of the invention have been described. It should be understood that various modifications may be made without departing from the spirit and scope of the invention. For example, various forms of the flows shown above may be used, with steps re-ordered, added, or removed. Also, although several embodiments of authorizing a remote terminal or mobile device have been described, it should be recognized that numerous other applications are contemplated. Accordingly, other embodiments are within the scope of the following claims.

We claim:

1. A portable-item location system comprising:
    a portable-item transmitter in a portable item to be tracked, the portable-item transmitter being configured to broadcast periodically a self-identification signal;
    a first receiver for receiving the self-identification signal from the portable-item transmitter, the first receiver being either stationary or portable and including a first-receiver processor and first-receiver memory, the first-receiver processor being configured to receive and measure the strength of the self-identification signal from the portable-item transmitter as a relative-received signal-strength-indicator (RSSI) value, and being configured to determine based on the RSSI value a distance $d_1$ that the portable-item transmitter is from the first receiver and to store the distance $d_1$ in the first-receiver memory;

a second receiver for receiving the self-identification signal from the portable-item transmitter, the second receiver being installed in a stationary office device and including a second-receiver processor and second-receiver memory, the second-receiver processor being configured to receive and measure the strength of the self-identification signal from the portable-item transmitter as an RSSI value, and being configured to determine based on the RSSI value a distance $d_2$ that the portable-item transmitter is from the second receiver and to store the distance $d_2$ in the second-receiver memory; wherein the first and second receivers are each configured to communicate wirelessly with the other to send to the other, on a predetermined periodic basis, the distance stored in the sending receiver's memory;

the first and second receivers are each configured to determine the distance between them using RSSI data, and to determine their respective locations and inter-receiver distance using either a global positioning system (GPS) or an assisted global positioning system (AGPS);

the first and second receivers are each configured to determine an effective correction factor and apply the effective correction factor to the distances $d_1$ and $d_2$, the first and second receivers determining the effective correction factor by computing the ratio of the distance between the first and second receivers determined using the GPS/AGPS data, to the distance between the first and second receivers determined using RSSI data; and the first and second receivers are each configured to determine the minimum $d_{min}$ of the distances $d_1$ and $d_2$ and store $d_{min}$, and to provide $d_{min}$, in periodically updated form, to a user.

2. The portable-item location system according to claim 1, wherein the first and second receivers are further each configured to:

determine, as portable-item location information, two possible locations of the portable-item transmitter by using trilateration in which the first and second receivers are the centers of circles whose radii are $d_1$ and $d_2$, respectively, to find the intersections of the two circles relative to the inter-receiver distance; and provide the portable-item location information to a user by visually displaying the portable-item location information to the user.

3. The portable-item location system according to claim 2, wherein the first receiver is a smartphone equipped with a receiver/transceiver circuit having GPS/AGPS capability.

4. The portable-item location system according to claim 1, wherein at least either the first or the second receiver is a multifunctional printer.

5. The portable-item location system according to claim 1, wherein the second receiver is constituted by a transceiver circuit in a multifunctional printer (MFP), and the transceiver circuit is powered by the MFP.

6. The portable-item location system according to claim 5, further comprising a global position system (GPS) receiver or an assisted global positioning system (AGPS) receiver provided in the MFP.

7. The portable-item location system according to claim 6, wherein the second receiver is further configured to provide to the first receiver location of the second receiver that the second receiver determines based on a signal received by the GPS/AGPS receiver.

8. The portable-item location system according to claim 1, wherein the first and second receivers are each a component of respective transceivers configured to send the location information a user's smartphone.

9. The portable-item location system according to claim 1, wherein the first receiver is a component of a smartphone.

10. A portable-item location method of using first and second receivers to locate a portable item equipped with a transmitter, the first receiver being either stationary or portable and including a first-receiver processor and first-receiver memory, the second receiver being installed in a stationary office device, the first and second receivers each being configured to communicate wirelessly with the other and respectively including first and second receiver memories, the method comprising:

having the portable-item transmitter periodically broadcast a self-identification signal;

using the first receiver, receiving the self-identification signal broadcast from the portable-item transmitter, measuring the strength of the self-identification signal as a relative-received signal-strength-indicator (RSSI) value, determining based on the RSSI value a distance $d_1$ that the portable-item transmitter is from the first receiver, and storing the distance $d_1$ in the first-receiver memory;

using the second receiver, receiving the self-identification signal broadcast from the portable-item transmitter, measuring the strength of the self-identification signal as an RSSI value, determining based on the RSSI value a distance $d_2$ that the portable-item transmitter is from the second receiver, and storing the distance $d_2$ in the second-receiver memory;

with the first and second receivers, wirelessly sending from each to the other on a predetermined periodic basis the distance stored in the sending receiver's memory;

determining the inter-receiver distance between the first and second receivers using RSSI data;

determining the respective locations of, and the inter-receiver distance between, the first and second receivers using either a global-positioning-system (GPS) signal or an assisted-global-positioning-system (AGPS) signal received by a device provided in the second receiver;

determining an effective correction factor by computing the ratio of the distance between the first and second receivers determined using the GPS/AGPS data, to the distance between the first and second receivers determined using the RSSI data, and applying the effective correction factor to the distances $d_1$ and $d_2$; and in the first and second receivers, determining the minimum $d_{min}$ of the distances $d_1$ and $d_2$ and storing $d_{min}$, and providing $d_{min}$, in periodically updated form, to a user.

11. The portable-item location method according to claim 10, further comprising:

determining, as portable-item location information, two possible locations of the portable-item transmitter by using trilateration in which the first and second receivers are the centers of circles whose radii are $d_1$ and $d_2$, respectively, to find the intersections of the two circles relative to the inter-receiver distance; and providing the portable-item location information to a user by visually displaying the portable-item location information to the user.

\* \* \* \* \*